March 15, 1955     J. P. MADDEN     2,704,142

CLUTCH BAND WITH FLEXIBLE MOUNTING

Filed Dec. 29, 1950

INVENTOR

*James P. Madden,*

BY *Natt McEnery Jr.*

ATTORNEY

# United States Patent Office 2,704,142
Patented Mar. 15, 1955

2,704,142

CLUTCH BAND WITH FLEXIBLE MOUNTING

James Patrick Madden, Bethlehem, Pa.

Application December 29, 1950, Serial No. 203,379

6 Claims. (Cl. 192—105)

My invention relates to improvements in centrifugally driven friction clutches of the type disclosed in Patent No. 1,856,135 to Nieman. Such clutches comprise a driving shaft to which is affixed a driving arm which is operatively connected to a flexible friction element. Upon rotation of the driving shaft the friction element is forced outwardly by centrifugal force against the inner surface of a drum affixed to a driven shaft, causing the latter shaft to rotate.

Such clutches are sometimes operated under conditions in which relative movement takes place between the driving shaft and the driven shaft in a longitudinal direction, for example if one or both of the shafts expand as a result of heating. Such relative movement may damage the clutch as by bending the driving arm, or otherwise.

It is an object of my invention to provide a centrifugal clutch in which relative longitudinal movement between the driving and driven shafts may occur without damaging the clutch. As used herein, the term "longitudinal" means in the direction of the axes of the shafts on which the clutch members revolve.

Another object of my invention is to provide a centrifugal clutch in which the friction member is capable of a limited movement in a longitudinal direction with respect to the driving shaft.

Another object of my invention is to provide yielding means for opposing relative longitudinal movement between friction member and the driving shaft.

Figure 1:
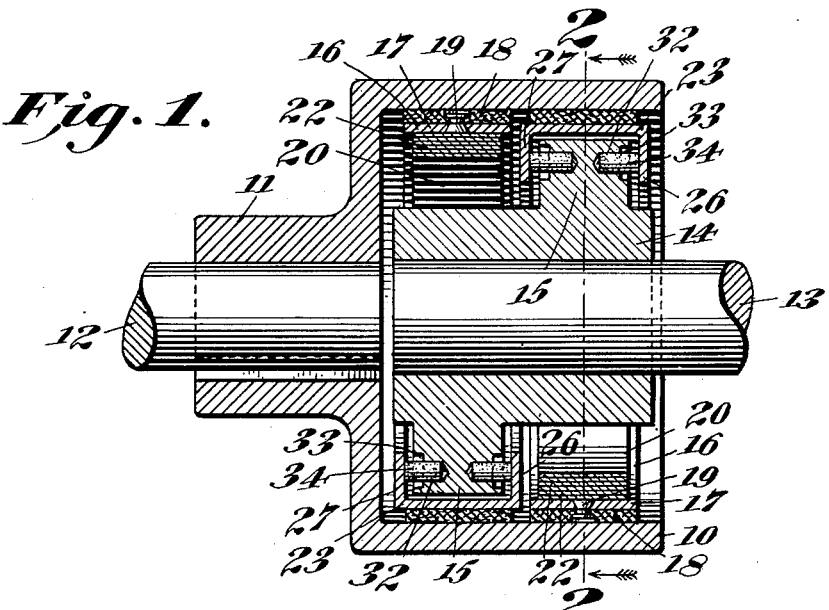
Figure 2:
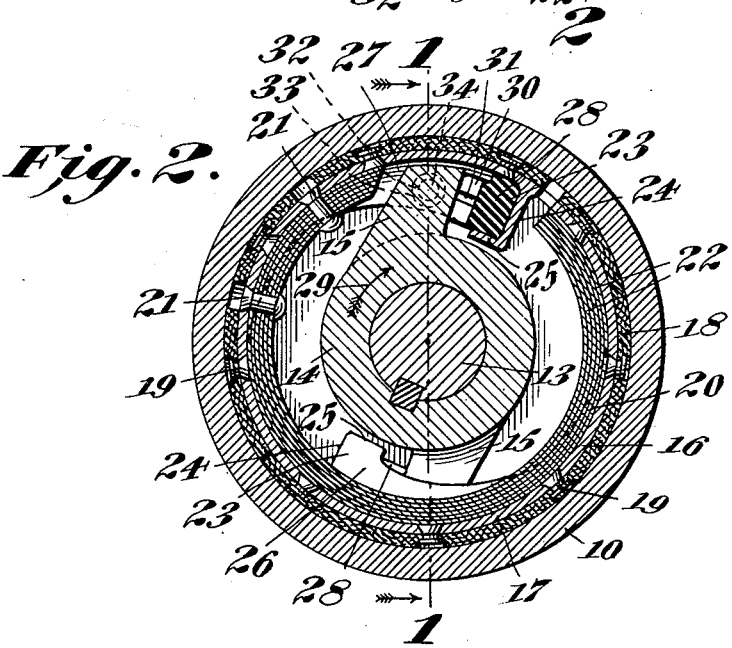

Other objects of my invention will appear from the following description and from the drawings in which Fig. 1 is a vertical longitudinal section of a friction clutch embodying my invention taken along the line 1—1 of Fig. 2; and Fig. 2 is a vertical transverse section taken along the line 2—2 of Fig. 1.

In the drawings, drum 10 provided with hub 11, is affixed to the driven shaft 12. Driving shaft 13, adapted to be driven by motor means not shown, has affixed thereto hub 14 provided with diametrically opposed driving arms 15, 15, each of which drives one of the flexible friction elements 16, 16. Each of said friction elements 16 comprises a resilient strip 17 of curved form. To the outer surface of said strip the friction lining 18 is affixed by rivets 19. The shoe 20 is affixed to the inner surface of strip 17 by rivets 21. Said shoe 20 is preferably composed of a number of laminations 22, thereby providing a flexible structure.

To one end of the strip 17 is affixed the socket member 23 comprising end wall 24, bottom wall 25 and side walls 26 and 27 which overlie but are spaced from the driving arm 15. Frictionally secured in said socket is resilient member 28 through which torque is transmitted to the friction element 16 when the driving shaft is rotated in the direction indicated by arrow 29. As show in Fig. 2, the ends of member 28 which engage the driving arm 15 are slotted as at 30 and 31, to increase the resiliency of said member. On opposite sides of the driving arm 15 are the sockets 32, 32 each of which is provided with a counterbore 33, 33. In each of the sockets 32 is fitted the resilient plugs 34, 34 the outer end of each of which is in contact with an inner side wall of socket 23, thereby holding the member 17 equidistant from said side walls 26 and 27.

In the operation of the clutch as described, rotation of the driving shaft 13 causes the driving arm 15 to rotate friction member 16. The latter expands and engages the inner face of drum 10, thereby rotating drum 10 and driven shaft 12.

If, while the clutch is in operation, any relative longitudinal motion takes place between driving and driven shafts, the friction element 16 is capable of limited longitudinal movement with respect to the driving arm 13 without damage to itself or to the driving arm. Depending on the direction of such movement, one or the other of the resilient plugs 34 will be compressed longitudinally and may expand laterally into counterbore 33.

When the clutch is disengaged, by stopping the driving shaft 13, the previously compressed plug 34 will expand longitudinally due to its resiliency and will again center the driving arm 15 with respect to the side walls 26 and 27 of socket member 23. Upon reengagement of the clutch, the flexible member 16 is again free to move longitudinally of the driving shaft to compensate for further relative longitudinal movement between driving and driven shafts.

It is obvious that helical springs may be substituted for the resilient plugs 34.

It will be seen from the foregoing that the resilient members 34 serve to locate the driving arm in a central position between side walls 26 and 27 of the socket member 23. As a result, a limited relative longitudinal movement may take place between driving and driven shafts when the clutch is engaged without damaging the clutch, as by bending driving arm 15 or socket member 23. Further, when the clutch is disengaged, the driving arm is again centered by the members 34 between the walls 26 and 27 of socket 23.

I claim:

1. In a friction clutch a rotating driving member, a driving arm affixed thereto, a centrifugally operated band member tractively engaged by said driving arm, resilient means interposed between said band member and said driving arm for permitting limited longitudinal movement between said band member and said driving member while said clutch is in operation and additional resilient means for resisting such longitudinal movement.

2. In a friction clutch, a centrifugally operated friction member having a recessed end portion provided with side walls, a rotatable driving arm located within said recess and spaced from the side walls thereof and resilient means interposed between said band member and said driving arm for spacing the side walls of said recess from said driving arm.

3. In a friction clutch a centrifugally operated band member, a recess at one end thereof, provided with a pair of opposed side walls, a driving member located within said recess, a pair of opposed sockets in said driving member, a resilient body extending from each socket and engaging the opposite walls of said recess.

4. In a centrifugal clutch and the like including a centrifugally operated band member, a driving shaft, and a driving arm operatively connecting said band member and said driving shaft, means interposed between said band member and said driving arm for permitting relative longitudinal movement between said band member and said driving shaft in a limited path while said clutch is in operation and additional resilient means for locating said band member centrally of said path.

5. In a centrifugal clutch, a centrifugally operated friction member, a socket member located at one end thereof and having side walls, a driving arm within said socket, a resilient member secured to each side of said driving arm and engaging a wall of said socket and a counterbore on each side of said driving arm surrounding said resilient members.

6. In a friction clutch, a driving shaft, a driving arm affixed to said shaft, a friction member adapted to be driven by said arm, a flexible connection between said driving arm and said friction member whereby said arm is free to move longitudinally of said friction member in a limited path while said clutch is in operation, and additional means for normally positioning said arm centrally of said path.

References Cited in the file of this patent

UNITED STATES PATENTS

| | | |
|---|---|---|
| 1,721,500 | Over | July 16, 1929 |
| 1,823,912 | Nieman et al. | Sept. 22, 1931 |
| 1,856,135 | Nieman | May 3, 1932 |
| 2,370,199 | Schuckers | Feb. 27, 1945 |
| 2,375,909 | Fawick | May 15, 1945 |
| 2,588,482 | Chapman | Mar. 11, 1952 |